June 16, 1964 J. C. GAVIN 3,137,210
PRESSURE RATIO BLEED CONTROL
Filed July 21, 1960 2 Sheets-Sheet 2

INVENTOR
JOHN C. GAVIN
BY David S. Fishman
AGENT

United States Patent Office 3,137,210
Patented June 16, 1964

3,137,210
PRESSURE RATIO BLEED CONTROL
John C. Gavin, Glastonbury, Conn., assignor to United Aircraft Corporation, East Hartford, Conn., a corporation of Delaware
Filed July 21, 1960, Ser. No. 44,507
14 Claims. (Cl. 91—47)

This application is a continuation in part of U.S. application No. 717,120 filed February 24, 1958, now abandoned.

This invention relates to compressor bleed controls for jet engines, more particularly to a pressure ratio intercompressor bleed control system for a jet engine.

The bleed control of this invention utilizes a differential pressure across a diaphragm to govern a pressure ratio schedule biased by a compressor inlet pressure. With the proper design, the control can be adapted to a wide variety of requirements.

In the control, according to the invention, a high pressure such as compressor discharge pressure is introduced into a dual series orifice system. An intermediate pressure which is a measure or signal of the high pressure results from the two orifice system, its relationship to the high pressure being dependent upon the dual orifice configuration. An important characteristic of a dual series orifice system is that the ratio between the air pressure entering the upstream orifice and the air pressure at or upstream of the throat of the downstream orifice will remain constant for any entering air pressure when the downstream orifice is choked. This intermediate pressure is introduced to the high pressure side of a two position actuating diaphragm, and a low pressure such as compressor inlet pressure is introduced to the opposite side of the diaphragm, which pressure in combination with a spring force opposes the force exerted by the intermediate pressure. A force unbalance across the diaphragm will result in a snap action movement of the diaphragm and the actuating mechanism associated therewith.

Adjustment of the system to various ranges of pressure ratio operation is obtained by sizing the upstream orifice and by varying the spring loading.

The advantages of the bleed system are: (1) the characteristics are inherently similar to those required by a jet engine, compensating for Reynolds' number effect on engine component performance, (2) the system is flexible and mechanically simple with no unreasonable sealing problems, and (3) the load on the diaphragm is constant at the actuating point and is independent of altitude.

An object of this invention is to provide an improved compressor bleed control for a jet engine.

Another object of this invention is to provide a pressure actuated compressor bleed control having an inherent ambient pressure correction.

Still another object of the invention is to provide a pressure ratio bleed control compensating for Reynolds' number effects which uses a dual series orifice system and which utilizes a differential pressure across a diaphragm to govern a pressure ratio schedule biased by compressor inlet pressure value.

Other objects and advantages will be apparent from the following specification and claims, and from the accompanying drawings which illustrate embodiments of the invention.

Figure 1:
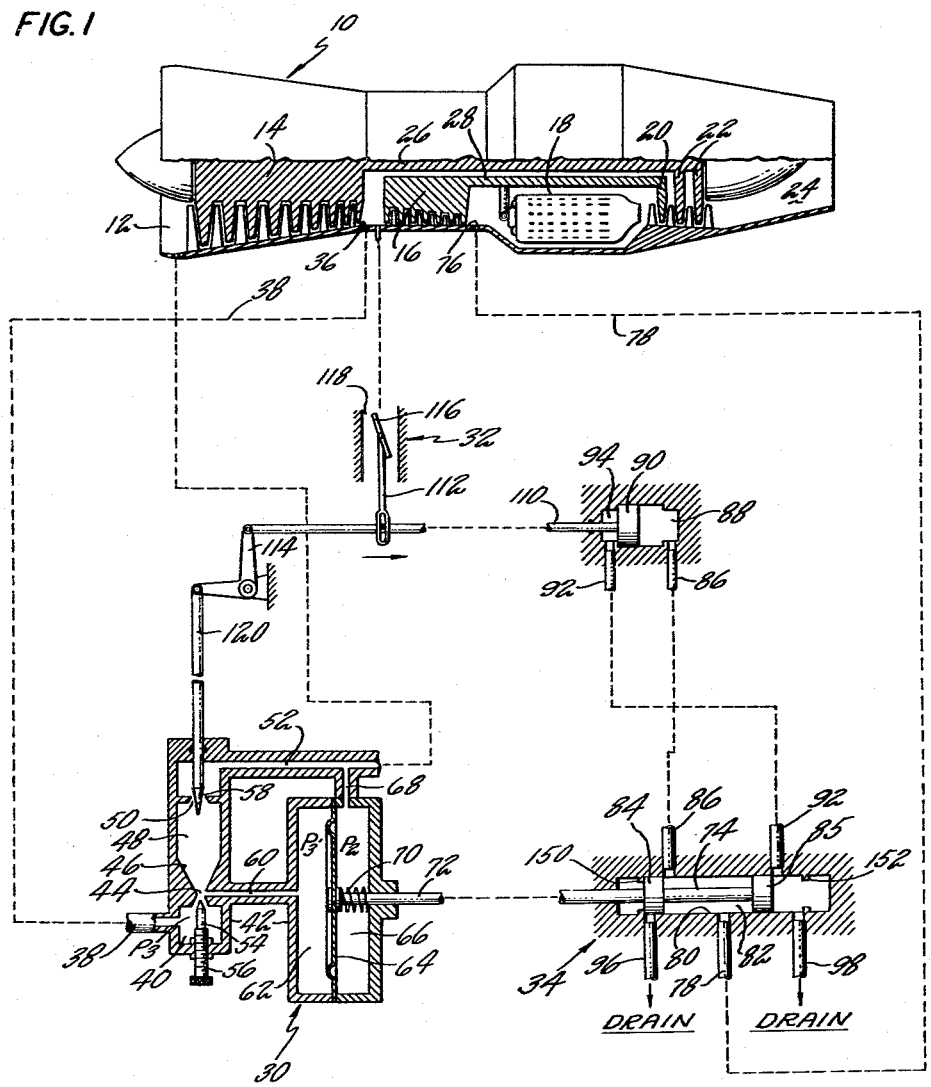
FIG. 1 shows a twin-spool jet engine in combination with a snap action intercompressor bleed system according to my invention.

Referring to the drawing in detail, in FIG. 1 a twin-spool jet engine is indicated at 10, the engine having inlet 12, low pressure compressor 14, high pressure compressor 16, burner 18, high pressure turbine 20, low pressure turbine 22 and exhaust nozzle 24 in the direction of gas flow through the engine. Low pressure turbine 22 is drivingly connected to low pressure compressor 14 by shaft 26, and high pressure turbine 20 is drivingly connected to high pressure compressor 16 by sleeve 28 surrounding shaft 26. The two turbine-compressor units or spools are not connected together, but rotate independently of each other. The structural arrangement is similar to well-known twin-spool jet engines.

Pressure ratio bleed control 30 is connected to the discharge end of low pressure compressor 14 and utilizes a low pressure compressor signal to actuate bleed valve 32 through pilot valve 34. Pressure station 36 is located between low pressure compressor 14 and high pressure compressor 16 and is connected by conduit 38 to chamber 40 within bleed control casing 42 to admit low pressure compressor discharge pressure, $P_3$, to the chamber. Compressor air flows from chamber 40 through venturi 44 including diffuser section 46 into chamber 48. From this chamber the air flows through orifice 50 in series with venturi 44 into passage 52 which is connected to air inlet 12 at the entrance to low pressure compressor 14. Diffuser section 46 is used to reduce the minimum pressure value at which orifice 50 will be choked.

Needle valve 54 is mounted within venturi 44. By means of threaded section 56 the position of the needle valve may be manually adjusted to regulate the throat area of the venturi. Needle valve 58 is mounted within orifice 50 and is operatively connected to bleed valve 32 to vary the area of the orifice in accordance with bleed valve area in a manner to be described below. Either needle valve may be contoured if desired.

The throat of venturi 44 is connected by passage 60 to chamber 62 at the left of diaphragm 64 to admit a pressure $P_{3'}$ to the chamber. Because of the above-mentioned characteristic of a dual series orifice system, $P_{3'}$ will be a fixed percentage of $P_3$ when orifice 50 is choked. That is, $P_3/P_{3'}$ will be a constant. Thus, $P_{3'}$ is a measure of $P_3$. Passage 60 is shown connected to the throat of venturi 44 because this yields the lowest value of $P_{3'}$. Passage 60 is shown at the throat of the upstream orifice and is, therefore, between the entrance to the upstream orifice and the throat of the downstream orifice. However, passage 60 could be located any place between the entrance to the upstream orifice and the throat of the downstream orifice and the relationship $P_3/P_{3'}$ would still be a constant. A low pressure, $P_2$, which is compressor inlet pressure, is admitted to chamber 66 at the right of the diaphragm through passage 68 connecting the chamber and passage 52. Spring 70 in chamber 66 biases diaphragm 64 to the left and assists pressure $P_2$ in balancing pressure $P_{3'}$.

Rod 72 is connected at one end to the center of diaphragm 64 and at its opposite end to spool valve 74 in pilot valve 34. High pressure compressor discharge pressure is used as a motor fluid by the pilot valve. The air is taken from engine 10 at pressure station 76 at the downstream end of compressor 16 and ducted by conduit 78 to bore 80 within the pilot valve. It is introduced to chamber 82 defined between lands 84 and 85 on spool valve 74. Dependent upon the position of the spool valve, motor fluid is admitted to either conduit 86 connected to chamber 88 at the right of power piston 90, or to conduit 92 connected to chamber 94 at the left of the power piston. Drains 96 and 98 are provided for venting chambers 88 and 94, respectively.

Power piston 90 is connected by rod 110 to arm 112 and bell crank 114. Arm 112 in turn is connected to closure 116 in bleed valve 32. Depending on the pressures across diaphragm 64, closure 116 will be either full open to allow bleeding or full closed to prevent bleeding through conduit 118 which is connected to engine 10 at the discharge end of low pressure compressor rotor 14. Bell crank 114 is connected to rod 120 which is integral with needle valve 58 in the pressure ratio bleed control.

Twin-spool jet engine operating characteristics require bleeding of some of the compressor airflow during the initial stages of engine operation or during low power operation. The engine operating characteristics also require bleeding when the engine is decelerated to low power operation. The points at which bleeding ceases during acceleration and commences during deceleration are determined by the pressure ratio across the low pressure compressor 14. However, engine operating characteristics require actuation of bleed valve 32 at different pressure ratios during acceleration and deceleration. Specifically, bleed 32 must be actuated to allow bleeding during deceleration at a pressure ratio which is higher than the pressure ratio at which bleeding is terminated during acceleration.

In operation of the bleed system, bleed valve 32 is open when engine 10 is not running and at relatively low speeds of compressor 14. This is so because $P_{3'}$ will not be sufficient to overcome $P_2$ plus the force of spring 70, and, therefore, spring 70 will bias rod 72 to the left and hold land 84 of spool valve 74 against stop 150. In this position, pressure line 82 will communicate with line 86 to introduce high pressure compressor discharge air to chamber 88 on the right of piston 90, and chamber 94 on the left of piston 90 will be vented via lines 92 and 98. Thus, piston 90 will be held to the left and closure 116 will be open to allow bleeding through bleed valve 32. As compressor speed increases low pressure compressor discharge pressure also increases, resulting in an increase in pressure $P_{3'}$ in chamber 62 with respect to pressure $P_2$ in chamber 66. As the compressor discharge pressure increases the difference between $P_{3'}$ and $P_2$ becomes sufficiently great to displace diaphragm 64 and spool valve 74 to the right where vlave 74 will be held against stop 152. In this new position of the spool valve, motor fluid is admitted from chamber 82 to conduit 92 and chamber 94 at the left of power piston 90. Chamber 88 and conduit 86 are connected, by virtue of the pilot valve position, to drain 96. The resultant pressure differential across power piston 90 displaces the piston to the right to shut closure 116 in bleed valve 32, terminating the bleeding of the low pressure compressor in the engine. Displacement of power piston 90 also moves needle valve 58 upward in orifice 50 thereby enlarging the area of orifice 50.

The closing of bleed valve 32 causes an immediate substantial increase in $P_3$, and the upward movement of needle valve 58 causes a simultaneous increase in area of orifice 50. This increase in area of orifice 50 changes $P_{3'}$ so that $P_{3'}$ becomes a smaller percentage of $P_3$. That is, the ratio $P_3/P_{3'}$ increases. However, as was previously stated, $P_3$ has increased significantly. Therefore, the absolute value of $P_{3'}$ is still sufficient to overcome $P_2$ plus the force of spring 70, and, thus, diaphragm 64 and spool valve 74 are held to the right. The large increase in $P_3$ also insures that orifice 50 remains choked so that $P_3/P_{3'}$ will be a new constant.

Figure 4:
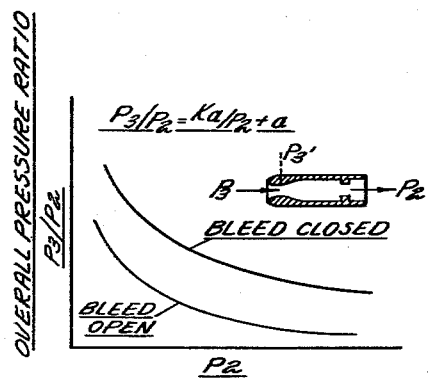
FIG. 4 is a plot of the characteristics of the pressure ratio bleed control.

The control is now reset to operate at a different ratio of $P_3/P_2$. Since $P_{3'}$ is now a smaller percentage of $P_3$, the force balance across diaphragm 64 will now occur for a higher value of $P_3$. Thus, the control will operate to move diaphragm 64 and valve 74 to the left to open bleed 32 at a higher ratio of $P_3/P_2$ than that at which the bleeds were closed. Referring to FIG. 4, the control is designed so that during acceleration bleed 32 is open below the line labelled "bleed open" and closed above that line, whereas during deceleration the bleed is closed above the line labelled "bleed closed" and open below that line.

To open the bleed valve, diaphragm 64, rod 72 and spool valve 74 must move to the left to connect conduit 86 to chamber 82 and admit motor fluid to chamber 88. This position of the spool valve connects chamber 94 to drain 98 and the resultant presusre differential across power piston 90 moves the piston to the left to open closure 116 and reposition needle valve 58.

The force balance point of pressure ratio bleed control 30 is defined by the following equation:

$$P_{3'} A = P_2 A + F \tag{1}$$

where
$A$ = Area of diaphragm 64 (sq. in.)
$F$ = Force of spring 70 (lbs.)

Dividing the equation by $P_2 A$ gives:

$$\frac{P_{3'}}{P_2} = 1 + \frac{F}{P_2 A}$$

$$\frac{P_{3'}}{P_2} - 1 = \frac{F}{P_2 A} \tag{2}$$

Let $$\frac{F}{A} = K$$

a constant. Then $$\frac{P_{3'}}{P_2} - 1 = \frac{K}{P_2} \tag{3}$$

Figure 3:
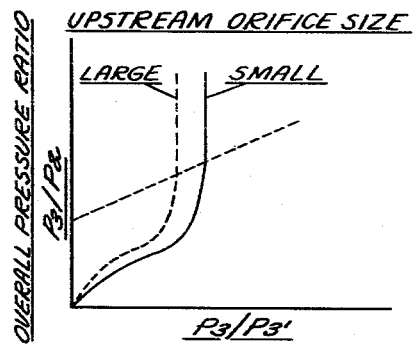
FIG. 3 is a plot of the characteristics of a dual series orifice system.

As has been stated, a constant value of $$\frac{P_3}{P_{3'}}$$

can be derived from a dual series orifice system such as that in bleed control 30. The absolute value is a function of overall pressure ratio $$\frac{P_3}{P_2}$$

and the area ratio of orifice 50 to venturi 44. Performance of such a system is plotted on FIG. 3. Indicated on the figure is a line above which orifice 50 would be choked, with $$\frac{P_3}{P_{3'}} = a$$

(a constant). Letting $$P_{3'} = \frac{P_3}{a}$$

and substituting in Equation 3 gives:

$$\frac{P_3}{P_2} = \frac{aK}{P_2} + a \tag{4}$$

The characteristic of Equation 4 plotted against $P_2$ produces the curve shape shown on FIG. 4, which shape can be made to satisfy the requirements of the low pressure compressor bleed valve actuation point to prevent surge. By varying the area of venturi 44 through manual adjustment of needle valve 54 and by varying the spring force F, a wide variation of engine characteristic curves similar to FIG. 4 at different levels of $$\frac{P_3}{P_2}$$

can be satisfied. Consequently, utilizing a differential pressure across a diaphragm results, in essence, in controlling a pressure ratio schedule biased by compressor inlet pressure. The control is biased by compressor inlet pressure because changes in $P_2$ require change in the pressure ratio $$\frac{P_3}{P_2}$$

across the control to produce the same actuating pressure differential across the diaphragm. The bleed control system of this invention can be trimmed by the proper selection of variables to satisfy the requirements of an engine for variation of inlet pressure comparable to flight operation.

Figure 2:
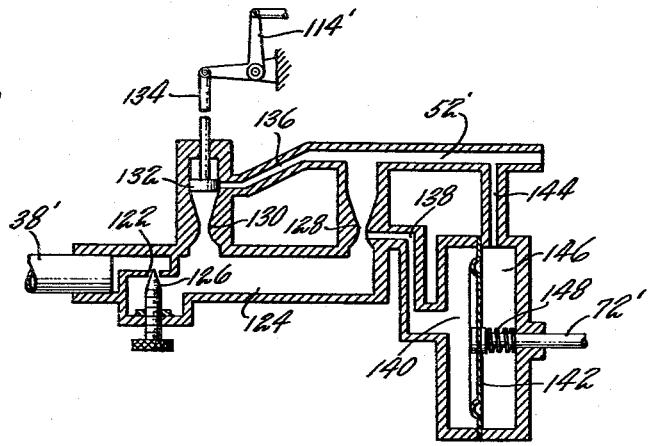
FIG. 2 shows a modified form of the bleed control.

A modified form of the pressure ratio bleed control is shown in FIG. 2. In the control 30 of FIG. 1 localized disturbances in venturi 44 due to needle valve 54 may be encountered for some installations. The control of FIG. 2 is a structural arrangement which can be used if any such disturbances appear.

In this control, high pressure air is admitted from conduit 38' through orifice 122, which corresponds to orifice 44, to passage 124. Needle valve 126 is mounted within the orifice and is designed to be manually adjustable so that the area of the orifice may be initially established.

Pressure air in passage 124 always will flow through venturi 128, which corresponds to orifice 50, to passage 52'. It also may flow to the passage through venturi 130, depending upon the position of piston 132 connected to rod 134 and bell crank 114', which controls the entrance to passage 136 connected to passage 52'. It should be obvious that when passage 136 is open venturis 128 and 130 operate in parallel.

Pressure air from immediately upstream of the throat of venturi 128 is conducted by passage 138 which corresponds to passage 60, to chamber 140 at the left of diaphragm 142, and pressure from passage 52' is conducted by passage 144 to chamber 146 at the right of the diaphragm. Spring 148 in chamber 146 loads the diaphragm to the left in opposition to the pressure in chamber 140. Rod 72' is connected at one end to diaphragm 142 and at its opposite end to pilot valve mechanism similar to that shown connected to rod 72 of FIG. 1. Passage 138 is shown connected to the throat of venturi 128 because this yields the lowest value of $P_{3'}$. However, as has been pointed out previously, the pressure ratio between the air entering orifice 122 and the air at or upstream of the throat of venturi 128 will be constant for any entering air pressure when venturi 128 is choked. Thus, passage 138 could be connected at any place between the entrance to orifice 122 and the throat of venturi 128 and the air delivered to chamber 140 will always be a measure of the pressure level of the air entering orifice 122.

Piston 132 is actuated in accordance with compressor bleed valve position in a manner similar to needle valve 58 in the control of FIG. 1. Thus, when the bleed valve is open the entrance to passage 136 is closed, and when the bleed valve is closed piston 132 is raised to open passage 136 and permit the flow of air through venturi 130. Opening and closing the connection between orifice 130 and passage 136 has the effect of varying the effective area of venturi 128. Opening passage 136 is similar to enlarging the area of venturi 128, and the pressure in chamber 140 is lowered. Thus, the control is reset to operate at a different overall pressure ratio.

It is understood that the invention is not limited to the specific embodiments herein illustrated and described, but may be used in other ways without departure from its spirit as defined by the following claims.

I claim:

1. A pressure ratio control including a casing, passage means within said casing for the flow of a gaseous fluid therethrough, an orifice in said passage means, means for manually establishing the area of said orifice, a pair of venturis in said passage means downstream of said orifice and connected to operate in parallel, means for controlling gaseous fluid flow through one of said venturis, chamber means within said casing having pressure responsive means therein, a passage connecting the other of said venturis and said chamber means to admit gaseous fluid to said chamber means to move said pressure responsive means in one direction, a passage connecting said passage means downstream of said orifice and said chamber means to admit gaseous fluid to said chamber means to move said pressure responsive means in the opposite direction, means operatively connected with said pressure responsive means to receive an output indicative of the displacement of said pressure responsive means, and means for actuating said gaseous fluid flow controlling means in response to said output.

2. A pressure ratio control including a casing, passage means within said casing for the flow of a gaseous fluid therethrough, a first orifice in said passage means, second and third orifices in said passage means downstream of said first orifice and connected to operate in parallel with each other, means for controlling gaseous fluid flow through one of said second and third orifices, the other of said orifices having a throat, chamber means having pressure responsive means therein, a passage connecting the other of said second and third orifices to said chamber means immediately upstream of the throat of the other orifice to admit gaseous fluid to said chamber means to load said pressure responsive means in one direction, means for admitting gaseous fluid to said chamber means to load said pressure responsive means in the opposite direction, means operatively connected with said pressure responsive means to receive an output indicative of the displacement of said pressure responsive means, and means for actuating said gaseous fluid flow controlling means in response to said output.

3. A pressure ratio control including conduit means connected to a source of gaseous fluid for the flow of a gaseous fluid therethrough, first and second orifices in said conduit means, said second orifice being choked at the level of flow of said gaseous fluid whereby flow through said second orifice is not increased by a reduction of pressure downstream of said second orifice, a chamber, snap action two-position pressure responsive means within said chamber, said pressure responsive means having only first and second positions and being normally in said first position, a passage connecting said conduit means to said chamber at a point between said orifices to admit gaseous fluid from said conduit means to said chamber to load said pressure responsive means toward said second position in accordance with a first constant percentage of the pressure of said gaseous fluid, means for loading said pressure responsive means toward said first position, means operatively connected with said pressure responsive means to yield a signal in response to actuation of said pressure responsive means from said first position to said second position, and means responsive to said signal having the effect of varying the effective area of said second orifice in accordance with the position of said pressure responsive means to load said pressure responsive means toward said second position in accordance with a second constant percentage of the pressure of said gaseous fluid.

4. A pressure ratio control as in claim 3 in which at least one of said orifices is a venturi.

5. A pressure ratio control including conduit means connected to a source of gaseous fluid for the flow of a gaseous fluid therethrough, first and second orifices in series relationship in said conduit means, said second orifice having a throat and being choked at the level of flow of said gaseous fluid whereby flow through said second orifice is not increased by a reduction of pressure downstream of said second orifice, a chamber, snap action two-position pressure responsive means in said chamber, said pressure responsive means having only first and second positions and being normally in said first position, a passage connecting said conduit means to said chamber at a point between the entrance to said first orifice and the throat of said second orifice to admit gaseous fluid from said conduit means to said chamber to load said pressure responsive means toward said second position in accordance with a first constant percentage of the pressure of said gaseous fluid, means for loading said pressure responsive means in the opposite direction, means operatively connected to said pressure responsive means to yield a signal in response to actuation of said pressure responsive means, and means responsive to said signal having the effect of varying the effective area of said second orifice in accordance with the position of said pressure responsive means to load said pressure responsive means toward said second position in accordance with a second constant percentage of the pressure of said gaseous fluid.

6. A pressure ratio control including conduit means connected to a source of pressurized gaseous fluid for the flow of pressurized gaseous fluid therethrough, first and second orifices in series relationship in said conduit means, said second orifice having a throat and being choked at the level of flow of said gaseous fluid whereby flow through said second orifice is not increased by a reduction of pressure downstream of said second orifice, a chamber, snap action two-position pressure responsive means within said chamber having only first and second positions, said pressure responsive means normally being in said first position, a passage connecting said conduit means to said chamber at a point between the entrance to said first orifice and the throat of said second orifice to admit a first constant measure of said pressurized gaseous fluid to said chamber to load said pressure responsive means toward said second position, means for pressure loading said pressure responsive means toward said first position, a spring biasing said pressure responsive means toward said first position, said pressure responsive means being actuated from said first position to said second position in response to a first predetermined pressure ratio between said pressurized gaseous fluid and said pressure for loading the pressure responsive means toward the first position, means operatively connected to said pressure responsive means to yield a signal in response to the actuation of said pressure responsive means from said first position to said second position, and means responsive to said signal having the effect of varying the effective area of said second orifice in accordance with the position of said pressure responsive means to establish a second constant measure of said pressurized gaseous fluid admitted to said chamber by said passage to establish an actuation point of said pressure responsive means from said second position to said first position, said pressure responsive means being actuated from said second position to said first position in response to a second predetermined pressure ratio between said pressurized gaseous fluid and said pressure for loading the pressure responsive means toward the first position.

7. A pressure ratio controls as in claim 6 in which at least one of said orifices is a venturi.

8. A pressure ratio control including conduit means connected to a source of pressurized gaseous fluid for the flow of a gaseous fluid therethrough, first and second orifices in series relationship in said conduit means, said second orifice having a throat and being choked at the level of flow of said gaseous fluid, a third orifice connected to operate in parallel with one of said orifices, a chamber, two-position pressure responsive means within said chamber, a passage connecting said conduit means to said chamber at a point between the entrance to said first orifice and the throat of said second orifice to admit gaseous fluid from said conduit means to said chamber to load said pressure responsive means in one direction, means for loading said pressure responsive means in the opposite direction, means operatively connected with said pressure responsive means to yield a signal in response to actuation of said pressure responsive means, and means for varying the area of said third orifice in accordance with the position of said pressure responsive means.

9. A pressure ratio control including conduit means connected to a source of pressurized gas for the flow of a pressurized gaseous fluid therethrough, a first orifice in said conduit means, a venturi in said conduit means downstream of said first orifice, said venturi being choked at the level of flow of said gaseous fluid, a second orifice connected to operate in parallel with said venturi, a chamber having two-position pressure responsive means therein normally in a first position, a passage connecting said conduit means to said chamber at a point between the entrance to said first orifice and the throat of said venturi to admit a first measure of said high pressure gaseous fluid to said chamber to load said pressure responsive means toward the second position, means for pressure loading said pressure responsive means toward the first position, a spring biasing said pressure responsive means toward said first position, said pressure responsive means being actuated from the first position to the second position in response to a first predetermined pressure ratio between said pressurized gaseous fluid and said pressure for loading the pressure responsive means toward the first position, means operatively connected with said pressure responsive means for yielding a signal in response to the actuation of said pressure responsive means, and means for controlling the flow through said second orifice in accordance with the position of said pressure responsive means to establish a second measure of said high pressure gaseous fluid admitted to said chamber by said passage to establish an actuation point of said pressure responsive means from the second position to the first position, said pressure responsive means being actuated from said second position to said first position in response to a second predetermined pressure ratio between said pressurized gaseous fluid and said pressure for loading the pressure responsive means toward the first position.

10. A pressure ratio control including passage means for the flow of a gaseous fluid therethrough, means including at least two orifices in series in said passage means with the downstreammost of said two orifices being choked whereby flow through said downstream orifice is not increased by a reduction of pressure downstream of said downstream orifice for establishing a first constant pressure ratio across the upstreammost of said two orifices, snap action two-position pressure responsive means having only first and second positions and being normally in said first position, means connecting said pressure responsive means with said passage between the entrance to the downstreammost orifice and the throat of the upstreammost orifice to load said pressure responsive means toward said second position in accordance with a first constant measure of the pressure of said gaseous fluid as determined by said first constant pressure ratio, means for pressure loading said pressure responsive means toward said first position, said pressure responsive means being actuated from said first position to said second position in response to a first predetermined ratio between the pressure of said gaseous fluid and the pressure for loading the pressure responsive means toward the first position, and means responsive to the displacement of said pressure responsive means from said first position to said second position to vary the gaseous fluid flow through said passage and establish a second constant pressure ratio across the upstreammost of said two orifices, said pressure ratio responsive means being actuated from said second position to said first position in response to a second predetermined ratio between the pressure of said gaseous fluid and said pressure for loading the pressure responsive means toward the first position.

11. A pressure ratio control as in claim 10 wherein the means responsive to the displacement of said pressure responsive means includes means having the effect of varying the effective area of the downstreammost of said two orifices.

12. A pressure ratio control as in claim 10 wherein at least one of said orifices is a venturi.

13. A pressure ratio control including passage means for the flow of a gaseous fluid therethrough, means including at least two orifices in series in said passage means with the downstreammost of said two orifices being choked whereby flow through said downstream orifice is not increased by a reduction of pressure downstream of said downstream orifice for establishing a first constant pressure ratio across the upstreammost of said two orifices, snap action two-position pressure responsive means having only first and second positions and being normally in said first position, means connecting said pressure responsive means with said passage between the entrance to the downstreammost orifice and the throat of the upstreammost orifice to load said pressure responsive means toward said second position in accordance with a first constant measure of the pressure of said gaseous fluid as determined by said first constant pressure ratio, means for pressure loading said pressure responsive means toward said first position, said pressure responsive means being actuated from said first position to said second position in response to a first predetermined ratio between the pressure of said gaseous fluid and the pressure for loading the pressure responsive means toward the first position, and means having the effect of varying the effective area of downstreammost of said orifices in accordance with the movement of said pressure responsive means to said second position to establish a second constant pressure ratio across the upstreammost of said two orifices, said pressure ratio responsive means being actuated from said second position to said first position in response to a second predetermined ratio between the pressure of said gaseous fluid and said pressure for loading the pressure responsive means toward the first position.

14. A pressure ratio control including passage means for the flow of a gaseous fluid therethrough, means including at least two orifices in series in said passage means with the downstreammost of said two orifices being choked whereby flow through said downstream orifice is not increased by a reduction of pressure downstream of said downstream orifice for establishing a first constant pressure ratio across the upstreammost of said two orifices, snap action two-position pressure responsive means having only first and second positions and being normally in said first position, means connecting said pressure responsive means with said passage between the entrance to the downstreammost orifice and the throat of the upstreammost orifice to load said pressure responsive means toward its second position in accordance with a first constant measure of the pressure of said gaseous fluid as determined by said first constant pressure ratio, means for pressure loading said pressure responsive means toward said first position, said pressure responsive means being actuated from said first position to said second position in response to a first predetermined ratio between the pressure of said gaseous fluid and the pressure for loading the pressure responsive means toward the first position, and means having the effect of enlarging the effective area of the downstreammost of said two orifices in accordance with the movement of said pressure responsive means to said second position to establish a second constant pressure ratio across the upstreammost of said two orifices higher than the first constant pressure ratio, said pressure ratio responsive means being actuated from said second position to said first position in response to a second predetermined ratio between the pressure of said gaseous fluid and said pressure for loading the pressure responsive means toward the first position.

References Cited in the file of this patent

UNITED STATES PATENTS

| | | |
|---|---|---|
| 2,775,231 | Silver | Dec. 25, 1956 |
| 2,837,269 | Torell | June 3, 1958 |
| 2,858,700 | Rose | Nov. 4, 1958 |
| 2,863,601 | Torell | Dec. 9, 1958 |
| 2,886,968 | Johnson et al. | May 19, 1959 |
| 2,925,710 | Gavin | Feb. 23, 1960 |
| 2,966,141 | Corbett | Dec. 27, 1960 |

FOREIGN PATENTS

| | | |
|---|---|---|
| 736,003 | Great Britain | Aug. 31, 1955 |

UNITED STATES PATENT OFFICE
CERTIFICATE OF CORRECTION

Patent No. 3,137,210                   June 16, 1964

John C. Gavin

It is hereby certified that error appears in the above numbered patent requiring correction and that the said Letters Patent should read as corrected below.

Column 5, line 74, after "means" insert -- immediately upstream of the throat of the other of said venturis --.

Signed and sealed this 27th day of October 1964.

(SEAL)
Attest:

ERNEST W. SWIDER
Attesting Officer

EDWARD J. BRENNER
Commissioner of Patents